United States Patent Office 3,305,544
Patented Feb. 21, 1967

3,305,544
METHOD OF PREPARING 2′,3′-O-ALKYLIDENE RIBONUCLEOSIDES
Osamu Simamura and Tadao Takenishi, Tokyo, Tetsuya Kato, Kawasaki-shi, Kanagawa-ken, and Hisao Mori, Tokyo, Japan, assignors to Ajinomoto Co., Inc., Tokyo, Japan
No Drawing. Filed June 3, 1964, Ser. No. 372,358
Claims priority, application Japan, Mar. 19, 1963, 38/14,741
7 Claims. (Cl. 260—211.5)

This application is a continuation-in-part of our co-pending application Serial No. 352,679, filed on March 17, 1964, and now abandoned.

This invention relates to a process for the preparation of 2′,3′-O-alkylidene ribonucleosides. These compounds are important intermediates in the synthesis of 5′-substituted ribonucleosides, such as 5′-ribonucleotides and compounds of the type of coenzyme A. 5′-substituted ribonucleosides are of interest not only to the biochemist but also to the food technologist. The sodium salts of naturally occurring purine 5′-ribonucleotides are known to have a pleasant meat-like flavor and are useful as seasonings.

The object of the invention is to provide a method of preparing 2′,3′-O-alkylidene ribonucleosides in an economical manner on an industrial scale.

It is known to prepare 2′-3′-O-isoproplylidene derivatives of ribonucleosides by reacting ribonucleosides with an excess of acetone in the presence of certain metal chlorides, particularly zinc chloride. The reaction is reversible, and the N-glycoside is apt to hydrolyze in an acid medium. It is, therefore, necessary to perform the reaction in an anhydrous medium.

We have now found that the reaction between purine ribonucleosides, such as inosine, guanosine, or adenosine, and di-lower-alkyl ketones, such as acetone and methyl ethyl ketone, is promoted by the presence of hydrogen chloride, and that the yield of the reaction can be very high under certain conditions even when the reaction is carried out under strongly acidic conditions.

According to our findings, the concentration of hydrogen chloride in the ketone solution must be relatively closely controlled because the N-glycoside bond of the nuceoside is fragile under the strongly acidic reaction conditions. The reaction temperature is relatively less important, but 10° C. and lower temperatures have been found to give highest yields.

The influence of the relative amounts of nucleoside, ketone, and hydrogen chloride on the yield of alkylidene nucleoside formed and nucleoside decomposed are evident from Table 1 which lists results of eighteen reactions between inosine, acetone, and HCl performed at 5° C. The amounts of isopropylidene inosine (Ip-inosine) and of hypoxanthine present in the reaction mixture after 30 minutes were determined, and the amount of inosine lost by decomposition was calculated from these figures.

Although inosine is not readily soluble in the mixture of acetone and hydrogen chloride, the nucleoside dissolves as it is being consumed by the reaction, and the solubility of inosine has no significant effect on the rate of reaction.

As can be seen from Table 1, the rate of reaction increases with the hydrogen chloride concentration, but so does the rate of decomposition at the N-glucoside bond of the ribonucleoside. Good yields in the presence of reasonable amounts of acetone are obtained with an initial hydrogen chloride concentration of 10 to 20 percent by weight in the liquid reaction medium which consists mainly of acetone.

With hydrogen chloride concentrations above 20 percent, the rate of decomposition to hypoxanthine and ribose is so high as to make good yields impossible. At hydrogen chloride concentrations between 5 and 10 percent, good yields are still available by the use of a very large excess of ketone, but such an excess makes the method unattractive for industrial use.

TABLE 1

| Test No. | Moles per mole inosine | | Concentration of HCl in Acetone (Percent) | Yield of Ip-inosine synthesized (Percent) | Amount of inosine decomposed (Percent) |
|---|---|---|---|---|---|
| | Acetone | HCl | | | |
| 1 | 5 | 5 | 38.6 | 25 | 66 |
| 2 | 40 | 20 | 23.9 | 64 | 32 |
| 3 | 10 | 5 | 23.9 | 61 | 29 |
| 4 | 5 | 2 | 20 | 80 | 14 |
| 5 | 47 | 15 | 16.6 | 89 | 7 |
| 6 | 34.8 | 10 | 15.6 | 91 | 6 |
| 7 | 75 | 20 | 14.3 | 94 | 4 |
| 8 | 80 | 20 | 13.5 | 88 | 10 |
| 9 | 22.4 | 5 | 12.3 | 90 | 4 |
| 10 | 26.3 | 4 | 10.6 | 96 | 0 |
| 11 | 19.7 | 3 | 8.8 | 77 | 0 |
| 12 | 40 | 5 | 7.3 | 39 | 3 |
| 13 | 89 | 10 | 7 | 76 | 3 |
| 14 | 177 | 20 | 7 | 97 | 3 |
| 15 | 17 | 2 | 7 | 40 | 1 |
| 16 | 80 | 5 | 3.8 | 17 | 2 |
| 17 | 100 | 5 | 3.0 | 15 | 1 |
| 18 | 150 | 5 | 2.1 | 8 | 2 |

With even lower amounts of hydrogen chloride, good yields are not available even when a large excess of ketone is used in an attempt to obtain a favorable equilibrium in the equation

$$\text{Inosine} + (CH_3)_2CO \rightarrow \text{Ip-inosine} + H_2O$$

At hydrogen chloride concentrations of 20 percent or less, the decomposition of the nucleoside can be held within tolerable bounds. The decomposition rate can be reduced to negligible proportions by chosing a hydrogen chloride concentration of 15 percent or less.

Guanosine and adenosine react with acetone and hydrogen chloride in the same manner as inosine, and the influence of process variables evident from Table 1 is observed with these nucleosides in an analogous manner. Other di-lower-alkyl ketones react substantially as acetone as long as the reaction medium is liquid at the temperature chosen. With any of these nucleosides and ketones, best yields of alkylidene ribonucleosides are obtained at HCl concentrations of 10 to 20 percent in the ketone when the reaction is being started.

The reaction between the ketone and the nucleoside results in the formation of water which is believed to promote the decomposition of the nucleoside. We have found that phosphorus chlorides such as $PCl_3$, $PCl_5$, and $POCl_3$ may be employed in the reaction mixture to absorb the water generated. These compounds in themselves promote the reaction between the nucleosides and the ketones, and may thus be employed partly or entirely to replace the hydrogen chloride in the reaction mixture as originally constituted. They generate HCl by reaction with water, and this further accelerates the reaction. The removal of water per se is not responsible for the effects of the phosphorus chlorides, as will be evident from Table 2 which includes results obtained with phosphorus pentoxide.

Table 2 lists the yields of isopropylidene inosine in a reaction mixture, 30 minutes and one hour after mixing of the reactants. Except for Test No. 1, 11.6 moles acetone, one mole hydrogen chloride, one mole inosine and one mole of the phosphorous compound listed were reacted with each other at 5° C. The amount of acetone in Test No. 1 was 10 moles, and hydrogen chloride was absent.

TABLE 2

| Test No | Phosphorus Compound | Yield of Ip-inosine after— | |
| --- | --- | --- | --- |
| | | 30 minutes | 1 hour |
| 1 | $PCl_5$ | 61 | 83 |
| 2 | $PCl_5$ | 97 | 91 |
| 3 | $POCl_3$ | 79 | 94 |
| 4 | $PCl_3$ | 38 | 57 |
| 5 | $P_2O_5$ | 6 | 44 |

Other conventional dehydrating agents such as anhydrous cupric sulfate, desiccated sodium sulfate, and silicate type drying agents are as ineffective as phosphorus pentoxide in enhancing the catalytic effect of hydrogen chloride on the reaction between the nucleoside and the ketone. As is seen from Test No. 1, phosphorus pentachloride promotes the reaction even in the initial absence of hydrogen chloride, and phosphorus oxychloride is similarly effective. Phosphorus trichloride is somewhat less effective, but still useful. Guanosine and adenosine react in a manner analogous to that illustrated by Table 2 with reference to inosine.

Before the alkylidene ribonucleoside is recovered from the reaction mixture, the latter is preferably neutralized to stop decomposition. Aqueous alkali metal or ammonium hydroxide solutions are preferred, but other alkaline materials may obviously be resorted to. The excess ketone may safely be distilled off from the neutral or weakly alkaline mixture, and some of the water is simultaneously removed. When the distillation residue is adjusted to pH 5–6 with any suitable acid, the alkylidene ribonucleosides become virtually insoluble in the aqueous system and are precipitated in crystalline form. They may be recrystallized for purification in a manner well known in itself.

The following examples are further illustrative of the present invention, and it will be understood that the invention is not limited thereto:

*Example I*

Ten grams adenosine, 27.2 ml. acetone and 30.4 ml. acetone containing 0.03 moles hydrogen chloride were mixed, and the mixture was stirred while its temperature was held at 10° C. Adenosine dissolved promptly, and a brown, clear solution was formed. The reaction solution was poured into an amount of 2 N sodium hydroxide solution equivalent to the hydrogen chloride in the solution. The solution was adjusted to pH between 8 and 9 and concentrated under reduced pressure. The concentrated solution was adjusted to pH 5 to 6 with hydrochloric acid to precipitate crude crystalline 2′,3′-O-isopropylidene adenosine. The mother liquor was further concentrated to recover additional crude crystals. The crystals collected weighed 9.3 g. (81%).

Only a single spot was detected on a paper chromatogram of the crystals in an acetic acid-butanol-water (1:4:5) solvent system, and the spot was identified as that of 2′,3′-O-isopropylidene adenosine. The crystals were recrystallized from water, and 8.2 g. were obtained. The melting point was 216° C.

*Example II*

10 grams inosine, 27 ml. acetone, and 30.2 ml. acetone containing 0.037 mole hydrogen chloride were stirred into a clear solution at 10° C. After 30 minutes, the solution was poured into sufficient 1 N sodium hydroxide solution to neutralize it. The neutralized solution was subjected to the procedure described in Example I, and 9.6 g. of crystalline 2′,3′-O-isopropylidene inosine were obtained (83.5%). Their melting point was 274 to 276° C.

*Example III*

Fifteen grams guanosine, 38 milliliters acetone, and 108 milliliters acetone containing 0.53 mole hydrogen chloride were mixed, and the mixture was stirred. The yield of the reaction at 10° C. was 84% after 2 hours. The reaction solution was poured into 3 N ammonium hydroxide solution to neutralize it, adjusted to pH 8–9, and concentrated to 100 ml. under reduced pressure. The pH of the concentrated solution was adjusted to a pH value between 5 and 6, and crystals were precipitated. The recovered and dried crystals weighed 12.8 g. (75%). Melting point was 296° C. Only a single spot identified as that of 2′,3′-O-isopropylidene guanosine was detected on a paper chromatogram of the crystals.

*Example IV*

13.6 grams gaseous hydrogen chloride were absorbed in a mixture of 10 g. inosine and 120 ml. methylethylketone. The mixture was stirred for 4 hours at 15° C. with stirring. The reaction solution was neutralized by pouring it into 2 N ammonium hydroxide solution, and the solution was adjusted to pH 8–9 with ammonium hydroxide solution. Methylethyl ketone was distilled off under reduced pressure, and the residual solution was concentrated to 70–80 ml. The pH of the concentrated solution was adjusted to 5–6 by adding concentrated hydrochloric acid solution drop by drop. The precipitated crystalline 2′,3′-O-isobutylidene inosine was recovered. The crystals weighed 9.8 g. (82%). Their melting point was 274 to 277° C.

*Example V*

The procedure described in Example IV was repeated, using 10 g. adenosine in place of the inosine.

9.2 grams 2′,3′-O-isobutylidene adenosine were obtained (76%). The melting point was 176.5° C.

*Example VI*

10 grams inosine were suspended in 120 ml. methylisobutyl ketone. 1.5 grams gaseous hydrogen chloride were absorbed in the suspension and the resulting solution was stirred to react for 2 hours at 15° C. with 8 g. phosphorus pentachloride. The obtained clear solution was poured into enough 2 N ammonium hydroxide solution to neutralize it. Unreacted methyl isobutyl ketone was distilled off under reduced pressure. The residual solution was concentrated to 70 to 80 ml. The concentrated solution was adjusted at pH to 5 to 6 with concentrated hydrochloric acid solution and crystalline 2′,3′-O-(1,3-dimethyl butylidene) inosine was precipitated. The crystals weighed 9.1 g. (70%), and their melting point was 259 to 261° C.

While the invention has been described with particular reference to specific embodiments, it is to be understood that it is not limited thereto, but is to be construed broadly and restricted solely by the scope of the appended claims.

What we claim is:

1. An improved method of preparing a 2′,3′-O-alkylidene purine ribonucleoside which comprises reacting a purine ribonucleoside with a di-lower-alkyl ketone in the presence of hydrogen chloride, said ribonucleoside being dissolved in said ketone, the ketone acting both as a solvent and as a reactant, and the initial concentration of said hydrogen chloride in the solution of said ribonucleoside in said ketone being between 10 and 20 percent.

2. An improved method of preparing a 2′,3′-O-alkylidene purine ribonucleoside which comprises reacting a purine ribonucleoside with a di-lower-alkyl ketone in the presence of hydrogen chloride, said ketone acting both as a solvent and a reactant, said nucleoside being reacted with said ketone in a liquid medium essentially consisting of said ketone, the concentration of said hydrogen chloride in said medium being between 10 and 20 percent.

3. A method as set forth in claim 2, wherein said ribonucleoside is selected from the group consisting of inosine, guanosine, and adenosine.

4. A method as set forth in claim 2, wherein said ribonucleoside is reacted with said ketone at a temperature not substantially above room temperature and above the melting point of said ketone.

5. A method as set forth in claim 4, wherein said temperature is not substantially higher than 10° C.

6. A method of preparing a 2′,3′-O-alkylidene purine ribonucleoside which comprises reacting a purine ribonucleoside with a di-lower-alkyl ketone in the presence of hydrogen chloride and of a phosphorus compound selected from the group consisting of phosphorus trichloride and phosphorus pentachloride, said ketone acting both as a solvent and a reactant.

7. A method as set forth in claim 6, wherein said ribonucleoside is selected from the group consisting of inosine, guanosine, and andenosine, and said ketone is a di-lower alkyl ketone.

References Cited by the Examiner

UNITED STATES PATENTS

| | | | |
|---|---|---|---|
| 2,482,069 | 9/1949 | Ruskin | 260—211.5 |
| 3,155,646 | 11/1964 | Hunter | 260—211.5 |
| 3,160,625 | 12/1964 | Simamura et al. | 260—211.5 |
| 3,201,388 | 8/1965 | Tsuchiya et al. | 260—211.5 |

LEWIS GOTTS, *Primary Examiner.*

JOHNNIE R. BROWN, *Assistant Examiner.*